(12) United States Patent
Soffer

(10) Patent No.: US 11,960,428 B2
(45) Date of Patent: Apr. 16, 2024

(54) MODULAR KVM SWITCHING SYSTEM

(71) Applicant: HIGH SEC LABS LTD., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 0 days.

(21) Appl. No.: 17/908,247

(22) PCT Filed: May 9, 2021

(86) PCT No.: PCT/IL2021/050525
§ 371 (c)(1),
(2) Date: Aug. 31, 2022

(87) PCT Pub. No.: WO2021/245644
PCT Pub. Date: Dec. 9, 2021

(65) Prior Publication Data
US 2023/0297532 A1    Sep. 21, 2023

(30) Foreign Application Priority Data

May 31, 2020   (IL) .......................................... 275024

(51) Int. Cl.
*G06F 13/40*   (2006.01)
*G06F 13/10*   (2006.01)

(52) U.S. Cl.
CPC ........ *G06F 13/4022* (2013.01); *G06F 13/102* (2013.01)

(58) Field of Classification Search
CPC .......................... G06F 13/4022; G06F 13/102

USPC ............................ 710/2, 15, 29, 33, 38, 64
See application file for complete search history.

(56) References Cited

U.S. PATENT DOCUMENTS

| | | | |
|---|---|---|---|
| 6,671,756 B1 | 12/2003 | Thomas et al. | |
| 6,672,896 B1* | 1/2004 | Li | G06F 3/023 439/502 |
| 7,284,278 B2 | 10/2007 | Anson et al. | |
| 2003/0035049 A1 | 2/2003 | Dickens et al. | |
| 2004/0177264 A1* | 9/2004 | Anson | G06F 21/84 726/34 |
| 2005/0044184 A1 | 2/2005 | Thomas et al. | |
| 2005/0044266 A1 | 2/2005 | O'Neil | |
| 2007/0257883 A1* | 11/2007 | Ke | G06F 3/0227 345/157 |

(Continued)

FOREIGN PATENT DOCUMENTS

| | | |
|---|---|---|
| IL | 211270 A | 6/2015 |
| WO | 2003/009118 A2 | 1/2003 |

*Primary Examiner* — Idriss N Alrobaye
*Assistant Examiner* — Henry W Yu
(74) *Attorney, Agent, or Firm* — AlphaPatent Associates Ltd.; Daniel J. Swirsky

(57) ABSTRACT

A modular keyboard video and mouse (KVM) switching system comprises a core KVM switch module, one or more console peripheral interface modules (CPIM) and one or more host computer interface modules (HIM). The CPIM interfaces console peripheral devices to the core KVM switch module and the HIM interfaces host computer to the core KVM switch module Changing of console peripheral devices or host computer involves adapting a corresponding CPIM or HIM without changing the core KVM switch module.

21 Claims, 7 Drawing Sheets

(56) References Cited

U.S. PATENT DOCUMENTS

| | | | |
|---|---|---|---|
| 2008/0031165 A1* | 2/2008 | Shen | H04B 3/36 370/293 |
| 2008/0062632 A1 | 3/2008 | Liu | |
| 2008/0098307 A1 | 4/2008 | Corbefin et al. | |
| 2008/0198128 A1 | 8/2008 | Tsai et al. | |
| 2010/0023660 A1* | 1/2010 | Liu | G06F 3/14 710/65 |
| 2010/0095031 A1* | 4/2010 | Shen | G06F 3/023 710/65 |
| 2013/0054848 A1* | 2/2013 | Huang | H01R 13/641 710/72 |
| 2014/0019652 A1 | 1/2014 | Soffer | |
| 2016/0154748 A1* | 6/2016 | Glaros | G06F 13/10 710/8 |
| 2018/0101496 A1* | 4/2018 | Chang | G06F 13/105 |
| 2018/0267305 A1* | 9/2018 | Liao | G02B 27/0101 |

* cited by examiner

MODULAR KVM SWITCHING SYSTEM

FIELD OF THE INVENTION

The present invention relates to a modular keyboard, video and mouse (KVM) switching systems that enable selection of connection of various user's console peripheral devices and various host computers having different interface protocols using a core KVM switch module (CKSM).

BACKGROUND OF THE INVENTION

There are many cases in which a single user may need to access multiple isolated computing systems. Due to security reasons, it may be critical that isolated computing systems not be connected together to prevent potential data leakages and to block certain security attacks. In other or additional cases, multiple users may need to be able to connect to more than one isolated computing systems in an isolated manner to prevent potential data leakages and to block certain security attacks. In order to allow one or more users to operate multiple host computers coupled to multiple isolated networks, several prior-art devices may be used, such as Secure KVM (Keyboard Video Mouse) switch, Secure KM (Keyboard and Mouse) switch, secure matrix switch, secure KVM combiner, secure USB switch, secure audio switch, similar multi-channel secure devices and the like.

Some organizations enforce isolation by placing two or more isolated sets of user peripheral devices on the user's desktop. Isolation is then assured, as there is no electrical contact between the multiple computers. A major disadvantage of this solution is its inherent reduced usability. Users find it hard to divide their attention between multiple systems. This solution also takes additional valuable user desktop space ("desk real-estate"). If more than two isolated computers are needed for a user, these usability and desktop space disadvantages tend to get worse.

Some organizations use KVM switch or secure KVM switch to enable user interaction with multiple isolated computers through one set of peripherals. This solution reduces the desktop space needed and provides better usability. As conventional KVMs may leak data between coupled isolated computers, in many cases a secure KVM is used. This type of KVM provides higher assurance that coupled computers would not leak data to one another. While this solution provides better usability, it is not suitable for users who need to see multiple displays simultaneously. Users such as traders need to see various data from multiple sources presented at all times on multiple displays. Although some secure KVMs supporting multiple displays are available today, this solution tends to be less flexible and relatively expensive and requires relatively high level of tailor-made for a given work environment.

Some organizations use KM (Keyboard and Mouse) switch to enable user interaction with multiple isolated computers through multiple isolated displays and one set of keyboard and mouse. Shared keyboard and mouse through software and/or hardware KM switch provides access to multiple computers by means of manual switching or even continues virtual display. Unlike KVM, the KM device switches only the keyboard and mouse, while the display outputs are not passed or switched through the KM switch.

There is a need for a secure KM switch that enables secure isolation between coupled computers. Such needed device will enable seamless user interaction with the isolated computers while viewing multiple displays. The needed secure KM switch should require minimal software and hardware installation in the coupled computers system.

SUMMARY OF THE INVENTION

A modular console keyboard, video and mouse (KVM) switching system is disclosed comprising at least one console peripheral interface module (CPIM) comprising a core KVM switch interface and console interface, a plurality of host computer interface modules (HIM), each comprising a core KVM switch interface and a host interface and a core KVM switch module. The core KVM switch module comprising one or more ports configured to be connected each to a console peripheral interface module, and a plurality of ports of core KVM switch interface configured to be connected each to a host computer module. The at least one CPIM is configured to be attached to one set of console peripheral devices, and the HIM is configured to be attached to a host computer. The core KVM switch is configured to couple a single selected active host computer to a single set of console peripheral devices through coupling data between a host interface module and a core peripheral interface module.

In some embodiments of the present invention, a system may have one or more console peripheral interface modules (CPIM) and host computer interface modules (HIM) that are easily replaceable in the field, for example, when a protocol for communicating with a host computer and/or with a console peripheral device has been changed. Such KVM systems provide KVM switching functionality across different peripheral interface protocols. According to some embodiments of the current invention, a secure modular CKSM is disclosed that further having security functions.

In some embodiments, the CPIM performs at least one of or a combination of: (1) multiplexing data, (2) converting data, (3) converting protocols between a set of console peripheral devices interface and core KVM switch interface.

In some embodiments, the HIM performs at least one of or a combination of: (1) multiplexing data, (2) converting data, (3) converting protocols between host interfaces and core KVM switch interface.

In some embodiments, the set of console peripheral devices comprises keyboard and pointing device.

In some embodiments, the set of console peripheral devices comprises a display.

In some embodiments, the core KVM switch interface supports HDMI communication standard.

In some embodiments, the CPIM performs conversion of communication protocols between HDMI and one of: (1) DVI, (2) DisplayPort (DP), and (3) VGA standards.

In some embodiments, the CPIM is configured to perform one or a combination of: (1) negotiating communication with a set of console peripheral devices based on ID of the set stored on the core KVM switch interface of the CPIM, (2) encrypting data sent to the set of console peripheral devices, (3) providing power requirements of the set of console peripheral devices to the core KVM switch, and (4) providing power to the core KVM switch from an external power source connected to the core KVM switch interface of the CPIM.

In some embodiments, the set of console peripheral devices comprises at least one of a smart card and common access card (CAC).

In some embodiments, the CPIM is configured to support connectivity with one or a combination of: single head and dual head displays.

In some embodiments, the CPIM is configured to support video communication according to one or a combination of video standards comprising DP, DVI and/or HDMI.

In some embodiments, the CPIM is configured to support communication of audio signals.

In some embodiments, the CPIM comprises heat sink elements adapted to allow conveyance of heat from the core KVM switch to a casing of the CPIM.

In some embodiments, the core KVM switch further comprising serial interface ports for connecting at least one of user console keyboard and pointing device.

In some embodiments, the core KVM switch further comprising serial interface port for connecting a remote control unit (RCU).

In some embodiments, the HIM performs conversion of communication protocols between HDMI and one of: (1) DVI, (2) DisplayPort (DP), and (3) VGA standards.

In some embodiments, the HIM is configured to perform one or a combination of: (1) negotiating communication with a host computer based on ID of the set stored on the core KVM switch interface of the HIM, (2) encrypting data sent to the host computer, (3) providing power requirements of the host computer to the core KVM switch, and (4) providing power to the core KVM switch from an external power source connected to the core KVM switch interface of the HIM.

In some embodiments, the HIM is configured to support connectivity with one or a combination of: single head and dual head displays.

In some embodiments the HIM is configured to support video communication according to one or a combination of video standards comprising DP, DVI and/or HDMI.

In some embodiments, the HIM comprises heat sink elements adapted to allow conveyance of heat from the core KVM switch to a casing of the HIM In some embodiments, the HIM is configured to support communication of audio signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
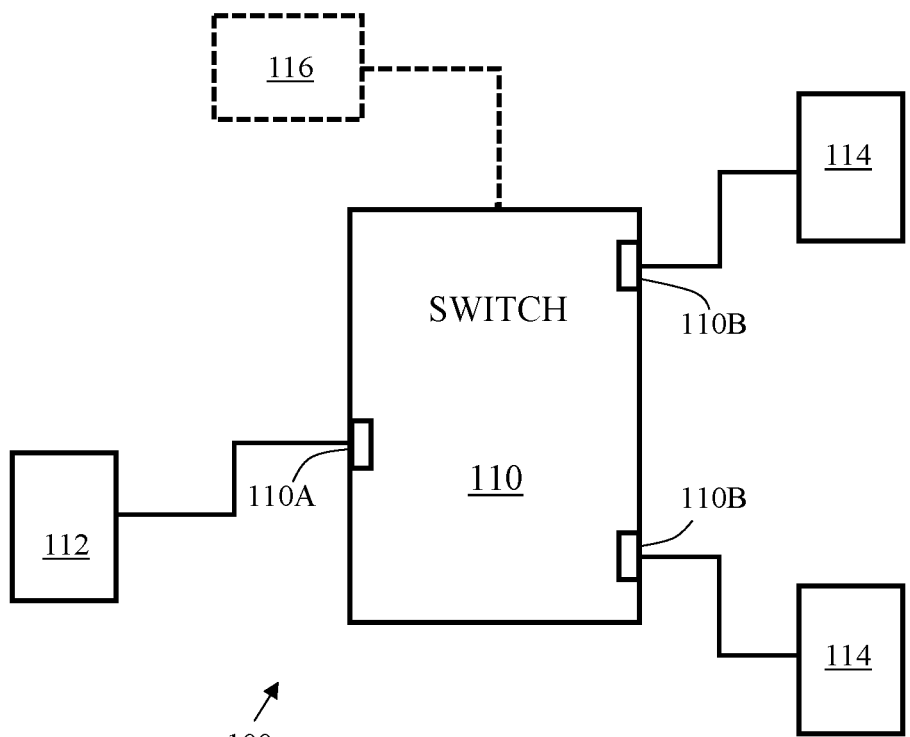
FIG. 1 is a schematic block diagram of a prior art switch system.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. In the following detailed description, the terms 'console peripheral device(s)' and 'console peripheral devices' are used interchangeably and the term 'set of console peripheral devices' refers to one or more console peripheral devices.

One of the challenges associated with the design of a modular secured KVM switching system is the need to provide a secure, cost effective and modular system that will provide secure switching to user console peripheral devices and host computers/computing systems that may use, each, one (or more) of many different communication protocols. For example, videos sent to a display may be transmitted using video graphic array (VGA) video standard, HDMI protocol, display data channel (DDC) protocol, etc. Various standards and protocols provide different levels of connectivity of the display unit to the host computer. Adapting the hardware and driver for one type of display may require user intervention, while other types are adapted to negotiate connection terms with the host computer until a reliable connection is automatically established. In the context of the current application, console peripheral devices may comprise one or more from a list consisting keyboard, video screen/display, pointing device such as a mouse (hereinafter pointing devices will be commonly denoted 'mouse') and other peripheral devices that may be adapted to communicate with a host computer via serial bus (e.g. a common access card (CAC), smart card, audio devices (e.g. microphone, speaker, handset, telephone handset), video camera and the like. A general group/set of console peripheral devices which comprises at least one of video screen, keyboard and mouse is denoted hereinafter KVM.

Similar complexity exists in providing a modular secure switch that should support connectivity of keyboard or mouse and other devices which may each use different types of connectivity requirements, standards and protocols.

Further, in order to provide a modular KVM secure switch that seamlessly integrates within a complex matrix of user end peripheral devices and plurality of host computers, each of the units—user devices at one side and host computer(s) at the other side of the switch system—should 'feel' as if the switch that is disposed between the units is virtually transparent.

Working computing environments in which a modular secure KVM Switch is used may vary from time to time in their setup, their topology, in the distance of a given unit from the switch, and the like. Such changes may reflect changing requirements from that computing environment, changing of physical location of one or more of the associated units, and the like. A modular KVM secure switch should be able to support a large range of changing computing environments.

Reference is made to FIG. 1, which is a schematic block diagram of a prior art switching system 100. Switching system 100 typically comprises KVM switch 110, at least one console 112 and host computers 114. Switch 110 is adapted to selectively connect console 112 to each one of host computers 114, without allowing leakage of data between the host computers 114 in case of a secured switch, as selected by a user. Console 112 is connected to switch 110 via console port 110A, and each of host computers 114 is connected to switch 110 via computer port 110B. In order to enable connectivity of console 112 to switch 110, the interface at console port 110A should comply with the communication requirements/protocols/standards of user's console set. In order to enable connectivity of host computers 114 to switch 110, the interface at host computer ports 110B should comply with communication requirements/protocols/standards of host computers 114. Such KVM switch replacement of either console 112 or host computer 114 with another console or computer, respectively, may require also replacement of KVM switch 110, in case the communication requirements/protocols/standards of the replaced unit have changed. Some prior art KVM switches also comprise remote-control unit (RCU) 116. RCU 116 may enable operating the KVM switch to select from a remote site the active connection in the switch and to receive indication of the switch status. RCU typically uses serial bus for establishing connection with KVM switch 110.

Each one of keyboard, mouse and display video may use at least one protocol and/or communication standard from a list of several protocols, standards and usage of available wires in the channel (where applicable) and pinout in the connector. The design requirement from a switch to enable virtually transparent flow of data and control between a given console and a selected host computer imposes a requirement that the switch be adapted to meet and engage with a large variety of console peripheral devices using a large variety of communication standards and protocols and a large variety of host computer communication protocols/standards in order to make the switch usable in a large number of set-ups of computing environments. KVM switches may need to convert the communication standard/protocol of a console peripheral device (K, M or V) to the required communication standard/protocol of the respective communication channel connected to the host computer. However, once the communication standard/protocol of a given port in the switch has been defined, changing it in order to meet a different standard/protocol may be unprofitable. This design requirement leads to unnecessary complexity of the switches, which unfortunately provide poor flexibility toward changes made in a computing environment after the switch was defined, purchased and installed. In some cases, the mere replacement of, for example, a console screen type by a more updated screen type may make the switch unusable or may impose the need for substantive modifications in the switch.

A switch, such as switch 110, may need to provide the following functionalities: switching enabling to connect a given user console to one selected host computer from several connected host computers; switchably connecting each one of a several user video displays to a selected host computer; and enabling secure and non-leaking flow of data between a connected user consoles and associated host computers. According to some embodiments of the invention, the following capabilities of a switch need to be addressed: high flexibility in connecting between and switching desired connection paths adapted to a large variety of user console devices, host computers and communication standards and protocols; occupation of relatively small "desk real-estate"; support of efficient heat dissipation; smart power management, monitoring and control; support of Extended Display Identification Data (EDID) metadata format for display devices; providing of secured communication (i.e., enforcing unidirectional data and/or control flow from a keyboard and mouse to a host and flow of video stream from host(s) to user's monitor).

A modular KVM switching system according to some embodiments of the invention enables connectivity to console peripheral devices each with a large number of different communication standards/protocols, and to host computers each with a large number of different communication standards/protocols without having to replace the KVM switch (hereinafter also 'core KVM switch') or to re-tune the switching KVM system following the change in communication standard/protocol of a user's console and/or host computer. A modular KVM switching system according to some embodiments of the present invention comprises a modular core KVM switch that is adapted to select, for example, connection of one user's set of console peripheral devices connected to the modular core KVM switch at least partially via a console peripheral devices interface module (CPIM), to a selected host computer that is connected to the modular core KVM switch via a host interface module (HIM).

A CPIM, according to some embodiments of the present invention, may be configured to provide one or more functionalities associated with the communication of a user's set of console peripheral devices with the KVM switch, such as: a) bidirectionally converting the communication standard/protocol at the core KVM switch module (CKSM) console port to a communication standard/protocol required at the user's set of console peripheral devices end of the console module and vice versa, and/or b) providing power to the user's console set of peripheral devices, and/or c) providing security protection, and/or d) providing module ID information to the core KVM switch usable for automated establishment of the communication between the console module and the core KVM switch after power-up, restart or replacement of the console module, and the like.

Figure 2A:
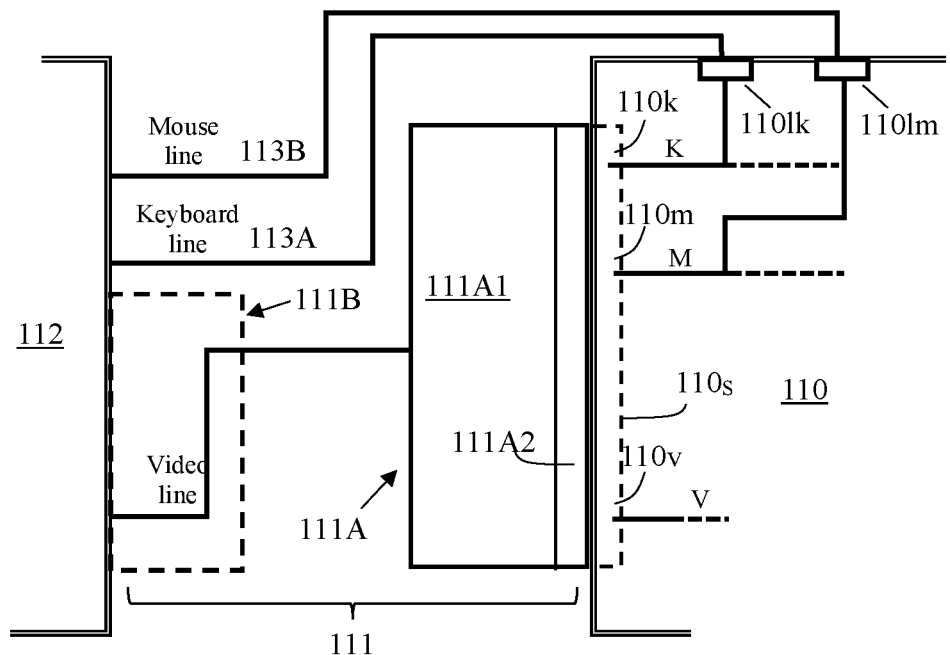
FIG. 2A is a schematic block diagram illustration of a connection of a user's console peripheral devices to a proximal KVM switch according to some embodiments of the present invention.

Reference is made now to FIG. 2A which is a schematic block diagram illustration of a connection of a user's set of console peripheral devices 112 to a core KVM switch 110 located proximal to set of console peripheral devices 112, via CPIM 111, according to some embodiments of the present invention. CPIM 111 may have a CKSM end (CSE) 111A and a set of console peripheral devices end (CPE) 111B. Console peripheral devices 112 may communicate with core KVM switch at least partially via CPIM 111. In the example of FIG. 2A, set of console peripheral devices 112 that is located close to core KVM switch 110 may carry out serial communication of a keyboard and/or a mouse with the core KVM switch via serial bus cables (e.g., USB cable) 113A, 113B, respectively, connected at the core KVM switch side to USB sockets 110$k$, 110$m$. Yet, according to some embodiments of the present invention, at least the video signals are provided to the video display of the console peripheral devices via CPIM 111. The CKSM end 111A of the CPIM 111 may comprise a CKSM-end multi-function unit 111A1 and a CKSM-end connector 111A2. Connector 111A2 is adapted to connect to core KVM switch 110 via console peripheral devices interface socket 110$s$. CKSM-end multi-function unit 111A1 is adapted to perform one or more of the functionalities (a)-(d) listed above.

Figure 2B:
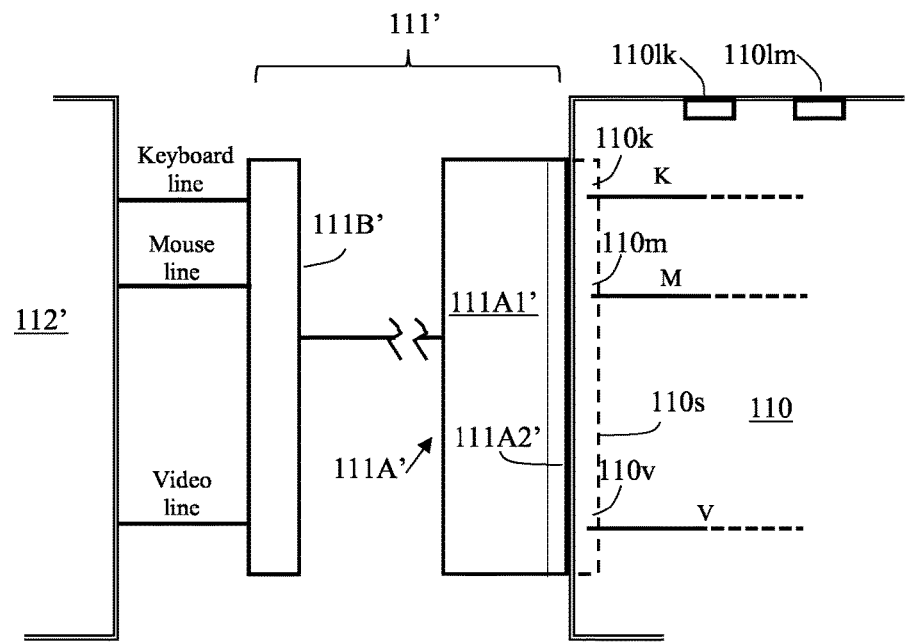
FIG. 2B is a schematic block diagram illustration of a connection of user's console peripheral devices to a remote KVM switch, according to some embodiments of the present invention.

Reference is made now to FIG. 2B which is a schematic block diagram illustration of a connection of a user's set of console peripheral devices 112' to a proximal core KVM switch 110 via CPIM 111', according to some embodiments of the present invention. CPIM 111' may have a CKSM end (CSE) 111A' and a console peripheral end (CPE) 111B'. Console peripheral devices may communicate with core KVM switch fully via the CPIM 111'. In the example of FIG. 2B, set of console peripheral devices 112 that is located distal from core KVM switch 110 may carry out the entire communication of set of console peripheral devices 112 with the core KVM switch 110 via CPIM 111'. The CKSM end 111A' of the CPIM 111 may comprise a CKSM-end multi-function unit 111A1' and a CKSM-end connector 111A2'. Connector 111A2' is adapted to connect to core KVM switch 110 via console peripheral devices interface socket 110$s$. CKSM-end multi-function unit 111A1' is adapted to perform one or more of the functionalities (a)— (d) listed above. Console peripheral devices end (CPE) 111B' may end with any desired standard or proprietary types of connector(s), sockets and the like, as may be needed to enable connection of console peripheral devices keyboard, video screen and mouse.

When the distance between core KVM switch 110 and set of console peripheral devices 112 is longer than 15 meters, more then 2-3 meters, preferably more the 5-10 meters and definitely over 15 meters, a long distance communication standard, such as HDBaseT, may be used, to support communication for distances as long as 100 meters. When longer distances exist, communication range extenders such as optical fiber extenders or the like may be used, as is known in the art.

Figure 3A:
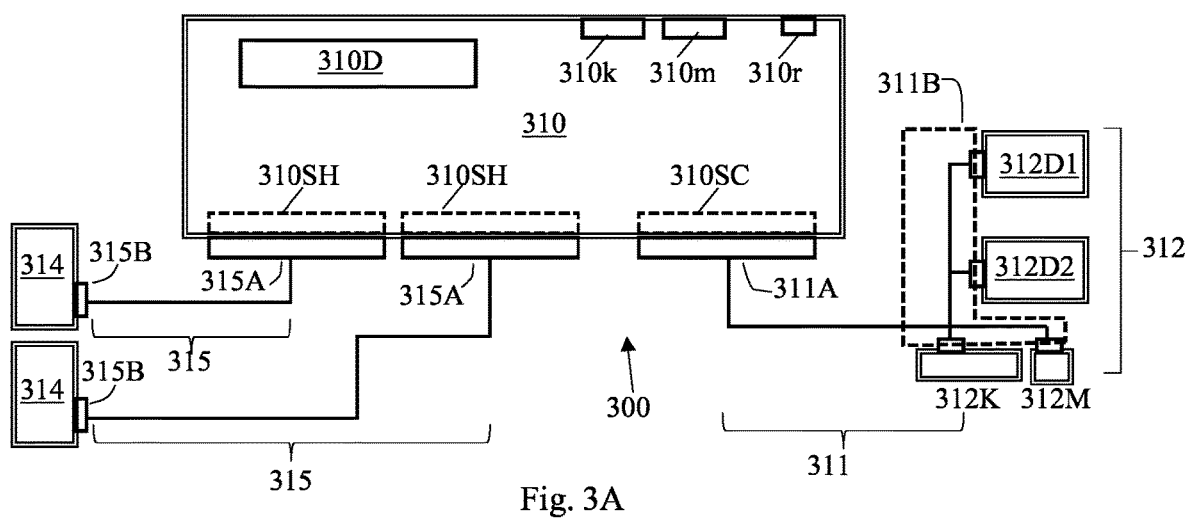
FIG. 3A is a schematic bock diagram illustration of a KVM switching system connected to two host computers and one user's set of console peripheral devices, according to some embodiments of the invention.

Reference is made now to FIG. 3A which a schematic block diagram illustration of a modular KVM switching system 300 connected to two host computers 314 and to one user's set of console peripheral devices 312 comprising two video displays 312D1 and 312D2, a keyboard 312K and a mouse 312M, according to some embodiments of the invention. Host computers 314 each communicate with core KVM switch 310 via host interface module (HIM) 315. Console set of peripheral devices 312 communicates with core KVM switch 310 via CPIM 311. CPIM 311 is similar to CPIM 111' of FIG. 2B, with the change of supporting two video display channels. CPIM 311 connects to core KVM switch with its core KVM switch-end unit 311A via switch socket 310SC. HIM 315 may comprise switch end 315A of the module and host end 315B of the module. Switch end 315A of HIM 315 may be built and may operate similar to switch end 111A, 111A' or 311A of CPIM modules 111, 111' or 311 and may be adapted to support keyboard and mouse signals as provided via core KVM switch 310 from set of console peripheral devices 312, and to provide video signals from host computers 314 to core KVM switch 310. Similar to the description above, long distance channels between host computer(s) 314 and core KVM switch 310 may require use of long distance communication standard such as HDBaseT, and, if longer distances are involved, range extenders may be used.

As discussed above with respect to FIG. 2A, core KVM switch may comprise USB sockets 310$k$ and 310$m$ for connecting directly to close keyboard and mouse (not shown). Core KVM switch 310 may further comprise on-box user interface 310D which may comprise keys for selecting the host computer to be connected to and visual indicators (e.g., LED indicators) for reflecting the operative status of core KVM switch 310. When the core KVM switch is remote from the user, a remote control unit (RCU) (not shown) may be connected to core KVM switch via socket 310$r$. The communication with a RCU may be done via any suitable communication standard, such as serial standard RS232.

Figure 3B:
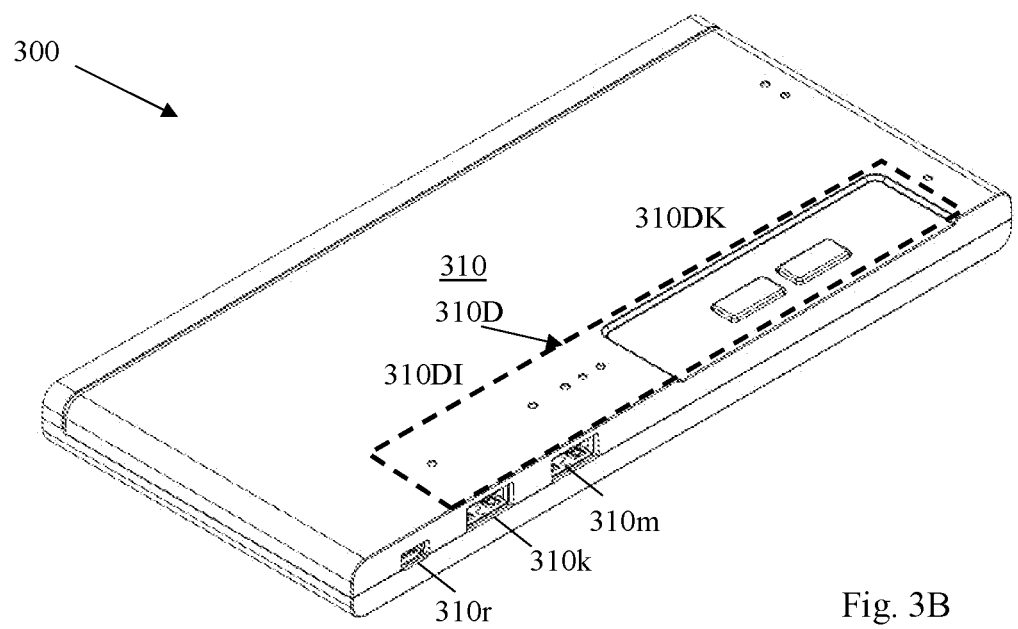
FIGS. 3B and 3C are schematic isometric illustrations of a KVM switch adapted to connect two host computers to one user's set of console peripherals shown from the front and from the rear of the switch, respectively, according to some embodiments of the invention.
Figure 3C:
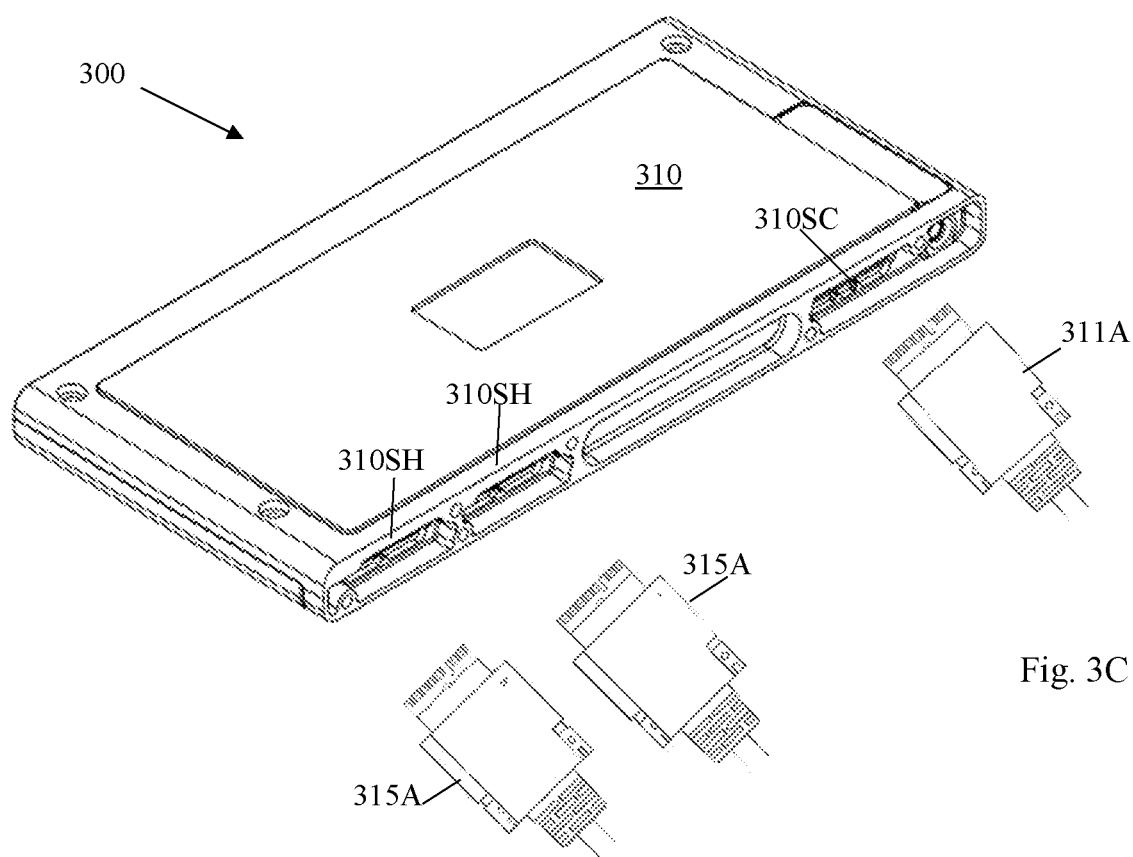

Reference is made now also to FIGS. 3B and 3C, which are schematic isometric illustrations of a core KVM switch 310 adapted to connect two host computers to one user's set of console peripheral devices, shown from front and from rear views of the switch, respectively, according to some embodiments of the invention. The isometric front view of core KVM switch 310 in FIG. 3B depicts top face and front face of switch 310. User interface 310D comprising user selection keys 310DK and user LED indicators 310DI are shown on the top face of core KVM switch 310. On the front face of core KVM switch 310, serial ports 310$k$ and 310$m$ for communicating with close keyboard and mouse and RCU port 310$r$ are shown.

The isometric rear and bottom view of core KVM switch 310 of FIG. 3B depicts host computer sockets 310SH and console peripheral devices socket 310SC. Also shown are core KVM switch-end unit 311A of CPIM 311 and two HIM 315 end units 315A.

Figure 3D:
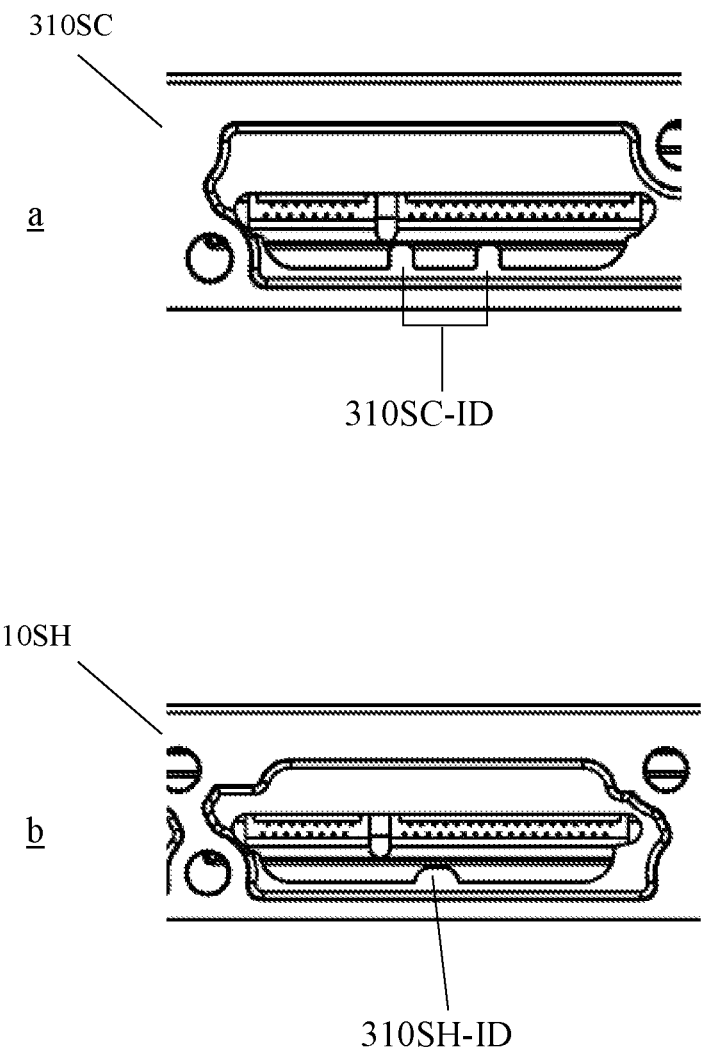
FIG. 3D is a schematic illustration of a computer socket and of a console peripheral devices socket, according to some embodiments of the invention.

Reference is made now also to FIG. 3D, which is a schematic illustration of a computer socket 310SH and of a console peripheral device socket 310SC, according to some embodiments of the invention. A schematic illustration of computer socket 310SH is shown in view "a", and a schematic illustration of peripheral socket 310SC is shown in view "b". In order to prevent misconnection of a set of peripheral devices to a host computer socket of core KVM switch and vice versa, each type of sockets—host computer socket and peripheral devices socket—has different configuration of the socket. View "a" depicts socket 310SC adapted to be connected to HIM, such as HIM 315. Socket 310SC comprises two identification dents 310SC-ID. The matching plug end of HIM 315 comprises two matching protrusions adapted to smoothly slide in dents 310SC-ID. Socket 310SH (view "b") of PCIM 311 comprises a single dent 310SH-ID that is located in a relative location within the socket different from the locations of dents 310SC-ID. The matching plug end of CPIM 311 comprises a single matching protrusion adapted to smoothly slide in dent 310SH-ID. This arrangement prevents insertion of a plug to the wrong socket.

The examples given above with respect to FIGS. 2A, 2B, 3A, 3B and 3C describe core KVM switch adapted to select connection of user's set of console peripheral devices to one of two host computers. It would be apparent to those skilled in the art that similar designs of modular KVM switching systems may be within the scope of these embodiments when enabling larger number of host computers to be switched so as to be connected to a user's set of console peripheral devices and/or to larger number of users' sets of peripheral devices, with the required changes in the core KVM switch.

According to some embodiments of the invention, CPIM may be adapted to provide connectivity to various configurations of a user's set of console peripheral devices, such as single video display (also known as single head) and dual video displays (dual head); CPIM supporting video standards DP, DVI and/or HDMI at the console end. Similarly, module HIM may be adapted to provide connectivity to various configurations of a user's set of console peripheral devices, such as single video display and dual video displays and video standards DP, DVI and/or HDMI at the host computer end. The various configurations above may support also communication of audio channel.

According to some embodiments of the invention, HIM may be adapted to provide connectivity to various configurations of host computers and to support connectivity configurations comprising providing video signals for single or dual head displays, to support video standards DP, DVI and/or HDMI at the set of console peripheral devices end, to support providing audio signals, to be connected via HDBaseT standard and or via communication range extender. In an exemplary embodiment of the invention, CPIM and HIM may be adapted to support connectivity of CAC, microphone, headset, telephone, video camera and the like. This design of architecture ensures the ability to interface and support any future console peripheral device as well as any future host interfaces by merely replacing the CPIM or the HIM, respectively, and optionally applying software upgrade to the CKSM.

Figure 4A:
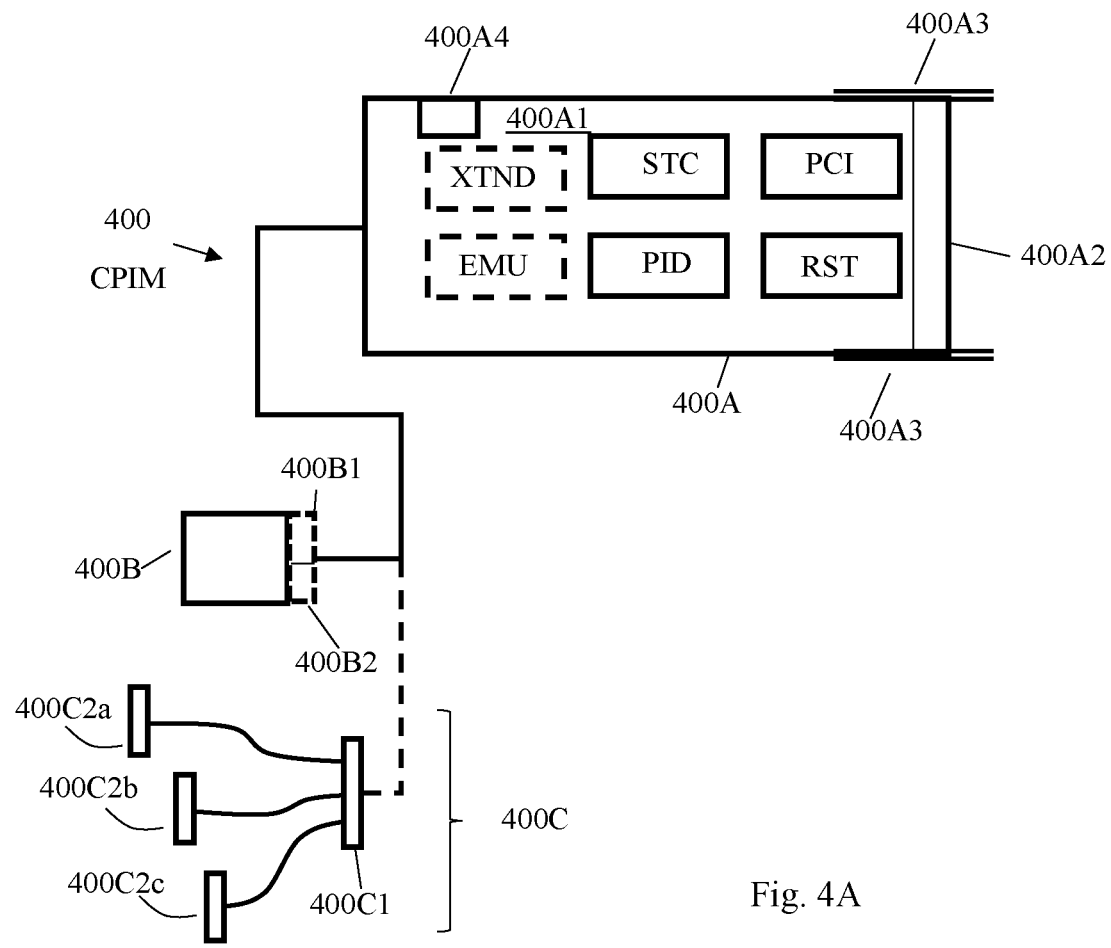
FIG. 4A is a schematic simplified block diagram of a CPIM, according to some embodiments of the invention.

Reference is made now to FIG. 4A, which is a schematic simplified block diagram of CPIM 400, according to some embodiments of the invention. CPIM 400 may comprise core KVM switch-end unit 400A comprising multi-function unit 400A1 and end unit connector 400A2. Multi-function unit 400A1 may be configured to perform one or more of the following functionalities: communication standard conversion (STC) from the standard set at the core switch side to the standard used by the connected user's set of console peripheral devices connected via console devices end-unit 400B and vice versa; storage of personal ID (PID) and performing of negotiation of handshaking and authentication with the core KVM switch; storage of power consumption info (PCI) of the connected set of console peripheral devices to the core KVM switch via the connector; obeying to RESET command (RST) from the core KVM switch either for initiating re-connection after connection process failure or in order to stop the connected equipment from consuming power from the switch.

In some embodiments, unit 400A may further comprise heat sink elements 400A3 adapted to allow conveyance of heat from core KVM switch to a casing of unit 400A in order to assist in dissipation of heat accumulated in core KVM switch. In some additional embodiments, a casing such as a casing of unit 400A may be produced from a material having good thermal conductance in order to assist in dissipation of heat accumulated in core KVM switch by plugging such thermal casing into vacant port on core KVM switch thereby extending the overall heat dissipation of core KVM switch. Additionally or alternatively, unit 400A may further comprise a fan for blowing air into or onto heat sink 400A3.

In some embodiments, switch end unit of CPIM 400 may comprise external power socket 400A4, adapted to connect external power source in order to enable injection of additional power to the console peripheral devices in case the power available from core KVM switch is not sufficient. In some other embodiments, power socket 400A4 may be used to provide power from core KVM switch to an external device. Additionally or alternatively, power socket 400A4 may be used to provide additional power from CPIM to the core KVM.

In some embodiments, switch end-unit 400A1 of CPIM 400 may comprise an emulator (EMU) adapted to match communication characteristics. A host computer emulator 400B1 may be installed as part of console-end unit 400B of CPIM 400.

In some embodiments, CPIM 400 may comprise range extender transceiver (XTND) installed at switch end-unit 400A1 of CPIM 400 unit, and 400B2 in console-end 400B of CPIM 400.

In some embodiments, a CPIM, such as CPIM 400, may comprise at the console peripheral devices end-unit 400C, a CPIM console end adaptor 400C comprising channel splitter unit 400C1 which provides connectivity to two or more different connectors 400c2a, 400c2b, and 400c2c, adapted each to connect to a respective console peripheral device. Each of connectors 400c2a, 400c2b, and 400c2c may end with a proper connector or socket, adapted to allow connection of the respective console peripheral device.

Figure 4B:
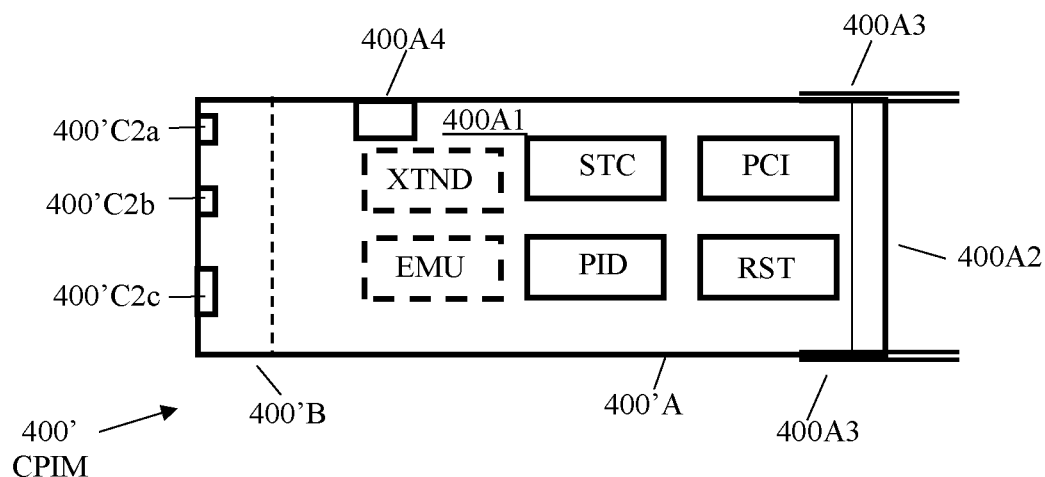
FIG. 4B is a schematic simplified illustration of a CPIM according to some embodiments of the invention.

Reference is made now to FIG. 4B, which is a schematic simplified illustration of CPIM 400' according to some embodiments of the invention. CPIM 400' may comprise functionalities and perform similar or identical functionalities as CPIM 400, yet CPIM 400' does not have cable connecting between core KVM switch-end unit 400'A and console peripheral devices end-unit 400'B. These two units may be accommodated in a common housing. The embodiment of CPIM 400' may be suitable for computing environments where a user's set of console peripheral devices is located very close to core KVM switch 110. Accordingly, part 400'B of CPIM 400' comprises sockets 400'C2a, 400'C2b, 400'C2c that function similarly to sockets 400C2a, 400C2b, 400C2c of FIG. 4A, respectively, and may enable connection of a user's console peripheral devices such as keyboard, mouse and video display using, for example, integral cables of the peripheral devices or off-the shelf cables. In an exemplary embodiment of the invention, some peripheral devices are connected in accordance with embodiment CPIM 400, while the other peripheral devices are connected in accordance with embodiment CPIM 400'.

Figure 4C:
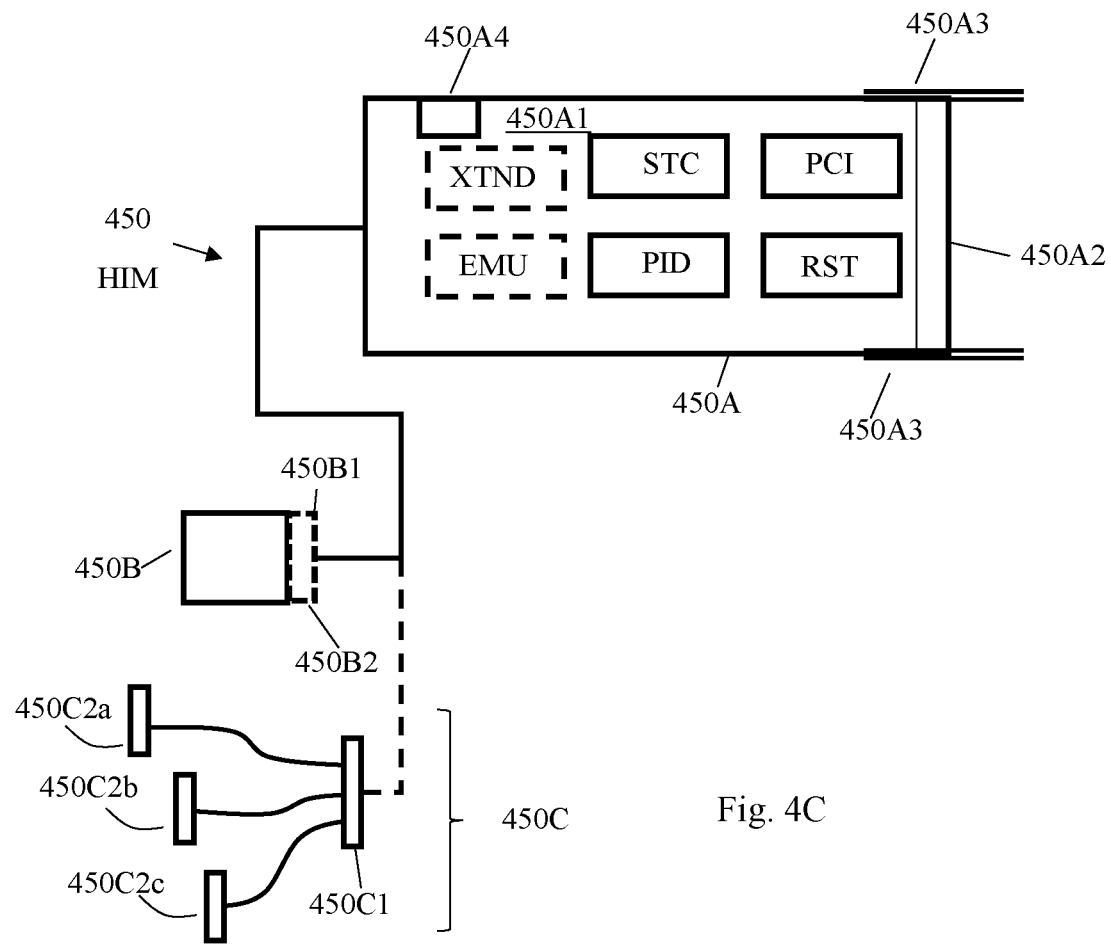
FIG. 4C is a schematic simplified block diagram of a HIM, according to some embodiments of the invention.

Reference is made now to FIG. 4C, which is a schematic simplified block diagram of HIM 450, according to some embodiments of the invention. HIM 450 may comprise core KVM switch-end unit 450A comprising multi-function unit 450A1 and end unit connector 450A2. Multi-function unit 450A1 may be configured to perform one or more of the following functionalities: communication standard conversion (STC) from the standard set at the core switch side to the standard used by the connected host computers connected via host computer end-unit 450B and vice versa; storage of personal ID (PID) and performing of negotiation of handshaking and authentication with the core KVM switch; storage of power consumption info (PCI) of the connected set of console peripheral devices to the core KVM switch via the connector; obeying to RESET command (RST) from the core KVM switch either for initiating re-connection after connection process failure or in order to stop the connected equipment from consuming power from the switch.

In some embodiments, unit 450A may further comprise heat sink elements 450A3 adapted to allow conveyance of heat from core KVM switch to a casing of unit 450A in order to assist in dissipation of heat accumulated in core KVM switch. In some additional embodiments, a casing such as a casing of unit 450A may be produced from a material having good thermal conductance in order to assist in dissipation of heat accumulated in core KVM switch by plugging such thermal casing into vacant port on core KVM switch, thereby extending the overall heat dissipation of core KVM switch. Additionally or alternatively, unit 450A may further comprise a fan for blowing air into or onto heat sink 450A3.

In some embodiments, switch end unit of CPIM 450 may comprise external power socket 450A4, adapted to connect external power source in order to enable injection of additional power to the host computer in case the power available from core KVM switch is not sufficient. In some other embodiments, power socket 450A4 may be used to provide power from core KVM switch to an external device. Additionally or alternatively, power socket 450A4 may be used to provide additional power from HIM to the core KVM.

In some embodiments, switch end-unit 450A1 of HIM 450 may comprise an emulator (EMU) adapted to match communication characteristics. A console peripheral devices' emulator 450B1 may be installed as part of console-end unit 450B of HIM 450.

In some embodiments, HIM 450 may comprise range extender transceiver (XTND) installed at switch end-unit 450A1 of HIM 450 unit, and 450B2 in host computer-end 450B of HIM 450.

In some embodiments, a HIM, such as HIM 450, may comprise at the host computer end-unit, a HIM host end adaptor 450C comprising channel splitter unit 450C1 which provides connectivity to two or more different connectors 450c2a, 450c2b, 450c2c, each adapted to connect to a respective host computer device. Each of connectors 450c2a, 450c2b, 450c2c may end with a proper connector or socket, adapted to allow connection of the respective host computer device. Host computer devices, in this respect, may refer to connection of keyboard entry, of mouse entry, of video display out signals, of audio signals, and the like.

Figure 4D:
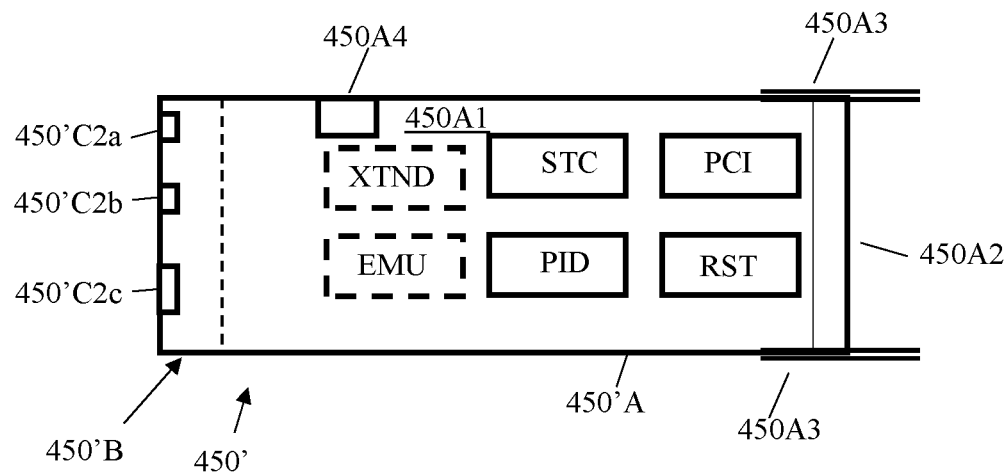
FIG. 4D is a schematic simplified illustration of a HIM according to some embodiments of the invention.

Reference is made now to FIG. 4D, which is a schematic illustration of HIM 450' according to some embodiments of the invention. HIM 450' may comprise functionalities and perform similar or identical functionalities as HIM 450, yet HIM 450' does not have cable connecting between core KVM switch-end unit 450'A and host computer end-unit 450'B. These two units may be accommodated in a common housing 450'A. The embodiment of HIM 450' may be suitable for computing environments where the host computer is located very close to core KVM switch 110. Accordingly, part 450'B of HIM 450' comprises sockets 450'C2a, 450'C2b, 450'C2c that function similarly to sockets 400C2a, 400C2b, 400C2c of FIG. 4C, respectively, and may enable connection of host computer input/output signals such as signals to/from keyboard, from mouse and video output using, for example, off-the shelf cables, such as standard USB cables or integral cables of the host computer. In an exemplary embodiment of the invention, some host ports for connecting with peripheral device are connected in accordance with embodiment HIM 450, while other host ports for connecting with the other peripheral devices are connected in accordance with embodiment HIM 450'.

In some embodiments, CPIM 400 may comprise encryption functionality to avoid untrusted replication, and/or optional tampering sensing means to avoid hacking the modules. In an exemplary embodiment of the invention, the PID functionality has a signature signed during manufacturing with a secret key that the core KVM controller can read and authenticate before further communication is performed via CPIM 400. Similarly, HIM 450 may comprise encryption functionality to avoid untrusted replication, and/or optional tampering sensing means to avoid hacking the modules. In an exemplary embodiment of the invention, the PID functionality has a signature signed during manufacturing with a secret key that the core KVM controller can read and authenticate before further communication is performed via HIM 450.

As described above, CPIM 400 may have various configurations at the console peripheral devices' end 400B. It may end with a single connector configured to provide the entire required connectivity (keyboard, video and mouse and optionally additional devices), or it may end with one connector configured to connect to the video display, typically via a standard video connector, one or more connectors adapted to connect to serial bus devices such as keyboard and mouse and optionally additional connectors adapted to connect to additional console peripheral devices. Other configurations of the console peripheral devices' end of CPIM may be in use, to provide connectivity to various configurations of console peripheral devices set up. In yet additional or alternative embodiments, the cable element may be a single cable at the switch-end unit 400A, and it may split to multiple cables at the other end, for example to separately connect, using a defined connector each to one of the console peripheral devices.

In an exemplary embodiment of the invention, the following list of CPIM modules are provided: a module with one-meter cable with HDMI connector at the cable end; a module with two meters cable split at the end to one DVI and one VGA connectors; a module with three receptacle connectors: two USB type A for keyboard and mouse and one DP for display video; a module with 6 feet cable split at the end to: one HDMI connector, one 3.5 mm audio plug for speaker, one 3.5 mm audio plug for microphone, and one micro USB Type B plug for a CAC reader; a module with LAN extender with a RG45 receptacle connector; and a module with Optical Fiber extender connected to 10 meter fiber optic with BFOC (IEC 61754-2) connector at the cable end.

In general, up to several hundreds of options of CPIM modules may be supported with a different combination of: cable length, plug or receptacle connectors versions, display format, such as, VGA, DVI, HDMI, DP with possibly several different connector form factors to each video format, single display or dual display support, peripheral devices formats and connectors types such PS/2, USB A/B/C/mini/micro formats, extenders types and connectors types and the like.

In an exemplary embodiment of the invention, the following exemplary short list of HIM modules are provided: a module with one-meter cable split at the host end to one HDMI connector and one USB connector; a module with two meters cable split at the host end to two DVI connectors and one USB connector; a module with two micro DP receptacle connectors and a three meters cable ended with one USB connector; a module with a 1.5 m cable split at the host end into VGA connector, a PS/2 KB connector; a module with LAN extender connected by 2 meter cable ending with RG45 connector; a module with Optical Fiber extender with small form-factor pluggable (SFP) fiber optic receptacle connector; and a module with a one-meter cable and single USB type-C plug connector that enable both video streaming and KM communication through a single USB 3.0 standard.

In general, up to several hundreds of options of HIM modules may be supported with a different combination of: cable length, plug or receptacle connectors versions, display format, such as, VGA, DVI, HDMI, DP with possibly several different connector form factors to each video format, single display or dual display support, peripheral devices formats and connectors types such PS/2, USB A/B/C/mini/micro formats, extenders types and connectors types and the like.

The solution described above enables simplified design of the switch by transferring certain functionalities from the switch outwardly, to the connector/adapter that serves a user set of console peripheral devices or a host computer and is adapted to ensure proper conversion of standard/protocol of data where needed. This design sets one communication standard/protocol for communicating keyboard and mouse data and one communication standard/protocol for communicating display data in all of the switch sockets that connect user console peripheral devices or host computer to the switch. Any data type/standard/protocol that is required is performed out of the switch in an equipment-dedicated connector/adapter.

In order to enhance universality of the switch according to some embodiments of the invention, a multi-pin connector that may support several connection functionalities may be used. In one embodiment, a PCIe (Peripheral Component Interconnect Express) connector may be used. Such connector may provide sufficient pins with spare pins in almost any known number of pins that may be needed to support the serviced connection. PCIe connector may also protect against erroneous connection since it has "connection polarity" partition built-in. Unit 320 in FIG. 3 represents the physical connector of connector-adapter 300. Pins of the connector may be used for power, data signals, control signals and the like. In some embodiments of the invention, when high data throughput is required, some of the spare pins in the connector may be assigned as additional data pins. Similarly, if relatively high power needs to be transferred, some of the spare pins may be assigned as additional power pins.

Figure 5:
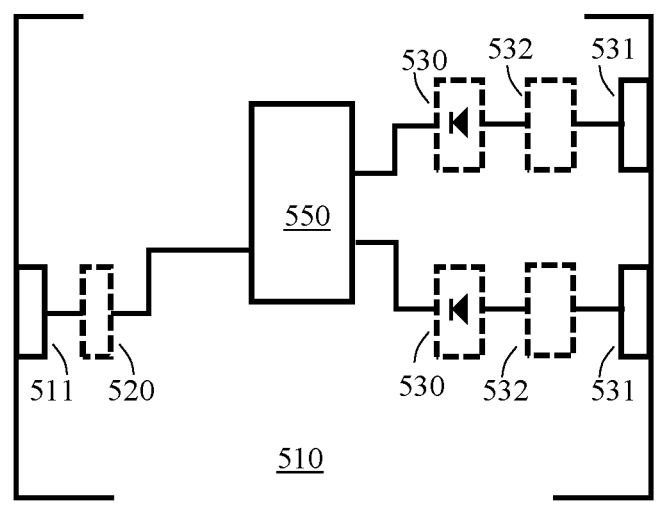
FIG. 5 is a schematic block diagram of core KVM switch 510 according to some embodiments of the present invention.

Reference is made now to FIG. 5, which is a schematic block diagram of core KVM switch 510 according to some embodiments of the present invention. Core KVM switch 510 exemplifies a simplified scheme of an embodiment of isolation topology that aims to ensure no leakage of data and/or control between two or more host computers that are connected to the core KVM switch at ports 531, or leakage of data flowing from the switch to the console peripheral devices and leaking there and flowing back to the switch. In order to prevent undesired data leakage, unidirectional data/control flow enforcing units 530 (hereinafter UNIDIR units) may be placed on the data flow paths in proper locations along the path. The general rule that directs the design where to put UNIDIR units is as close as possible in the core KVM switch to the ports through which the host computer is connected. According to some embodiments of the invention, peripheral device emulators 532 may be placed between unidir units 530 and corresponding ports 531, and host emulator 520 may be placed between console port 511 on core KVM switch 510 and core KVM switch processor 550. Core KVM switch may be provided, in some embodiments without unidir units 530 and without emulators 532 and 520, providing basically switching capabilities and associated switching services performed by core KVM switch processor 550. When unidir units 530 and emulators 520 and 532 are used, core KVM switch provides secured connectivity. It should be stressed here that the direction of flow as indicated by the symbol in unidir isolator units 530 is a symbol only of multiple channel isolator, and the actual direction may be from host computer to peripheral devices (e.g., providing display, speaker audio and the like) or from console peripheral device to host computer (e.g., keyboard, mouse, CAC unit, microphone signals, camera signals, and the like).

For the sake of simplicity of the description herein, in FIG. 5, all of the control, computations, switching and any other data handling that are performed by core KVM switch 510, except for the control of the operation of interface ports 531, are represented by controller unit 550. Host computers (not shown) may be connected to core KVM switch 510 via ports 531. In order to provide high level of confidence against signal leakage between different host computers before any processing, switching, encrypting/decrypting or any other processing is performed by switch controller 550, UNIDIR units 530 may be placed between ports 531 and controller 550. According to some embodiments of the invention, unidirectionality may be embodied for example using isolation technics such as ground and power lines separation and filtration between each host computer channel and another host computer channel. It should be apparent that controller 550 is presented schematically and may be configured to perform several other functionalities, such as controlling the switch interfaces. The example presented in FIG. 5 is meant to depict the way that security and leakage prevention influences topology of the data flow paths. Controller 550 may be configured to perform and to control many functions and operations such as power management of power provided to connected equipment based on indirect measurement of the consumed power and further based on power requirements of the connected equipment as provided by the equipment connector, as further described above.

In an exemplary embodiment of the invention, a core KVM switch may comprise a plurality (n) of "310SC" and a plurality (m) of "310SH" to provide a KVM matrix configuration that enables n users to operate m hosts. In this case, each user has its own set of console peripheral devices, and the core KVM matrix enables any of the n users to be connected or switched to any of the m host, conditioned that no host is connected to more than a single user at the same time.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A modular console keyboard, video and mouse (KVM) switching system comprising:
    at least one console peripheral interface module (CPIM) configured to be attached to a set of console peripheral devices;
    a plurality of host computer interface modules (HIM), each configured to be attached to a host computer; and
    a core KVM switch module (CKSM)
    configured to be directly connected to the at least one console peripheral interface module (CPIM) and to the plurality of host computer interface modules (HIM), and configured to couple a single selected active host computer to a single selected set of console peripheral devices through coupling between any one of the HIMs and any one of the CPIMs,
    wherein the CKSM comprises at least one socket type console connector, and a plurality of socket type host connectors, wherein the at least one CPIM comprises a CPIM-based CKSM-end unit housing a CKSM-end multi-function unit and a CKSM-end connector,
  wherein the CKSM-end connector is a plug type connector,
  wherein one side of the CKSM-end connector of the CPIM-based CKSM-end unit is mechanically rigidly permanently connected to the CKSM-end multi-function unit, and
  wherein the other side of the CKSM-end connector of the CPIM-based CKSM-end unit is configured to be pluggable to the socket type console connector whereby the CPIM-based CKSM-end unit is configured to be directly connected to the CKSM,
wherein each of the plurality of HIMs comprises a HIM-based CKSM-end unit housing a CKSM-end multi-function unit and a CKSM-end connector,
  wherein the CKSM-end connector is a plug type connector,
  wherein one side of the CKSM-end connector of the HIM-based CKSM-end unit is mechanically rigidly permanently connected to the CKSM-end multi-function unit, and
  wherein the other side of the of the CKSM-end connector of the HIM-based CKSM-end unit is configured to be pluggable to the socket type host connector whereby the HIM-based CKSM-end unit is configured to be directly connected to the CKSM,
wherein the host socket and the console socket have different socket configuration such that any of the host connectors matches any of the HIM-based CKSM-end plug connectors and any of the console connectors matches any of the CPIM-based CKSM-end plug connectors in order to prevent misconnection,
wherein upon connection of the CKSM to the at least one CPIM and the plurality of HIMs, a unified, non-distributed, KVM switching system, configured to be deployed on a user's desktop, is formed.

2. The KVM switching system of claim 1, wherein the CPIM performs at least one of or a combination of: (1) multiplexing data, (2) converting data, (3) converting protocols between console devices interface and core KVM switch interface.

3. The KVM switching system of claim 1, wherein the HIM performs at least one of or a combination of: (1) multiplexing data, (2) converting data, (3) converting protocols between host interfaces and core KVM switch interface.

4. The KVM switching system of claim 1, wherein the set of console peripheral devices comprises keyboard and pointing device.

5. The KVM switching system of claim 1, wherein the set of console peripheral devices comprises a display.

6. The KVM switching system of claim 1, wherein the core KVM switch interface supports HDMI communication standard.

7. The KVM switching system of claim 2, wherein the CPIM performs conversion of communication protocols between HDMI and one of: (1) DVI, (2) DisplayPort (DP), and (3) VGA standards.

8. The KVM switching system of claim 1 wherein the CPIM is configured to perform one or any combination of: (1) negotiating communication with the core KVM switch based on personal ID of the CPIM stored in CPIM, (2) authenticating communication with the core KVM switch (3) encrypting data sent to the set of console peripheral devices, (4) providing range extension (5) providing information indicative of power requirements of the console peripheral set of devices to the core KVM switch and (6) providing power to at least one or any combination of (a) the CPIM circuitries; (b) the set of console peripheral devices; and (c) the core KVM switch from an external power source connected to the core KVM switch interface of the CPIM.

9. The KVM switching system of claim 1 wherein the set of console peripheral devices comprises at least one of a smart card reader and common access card (CAC) reader.

10. The KVM switching system of claim 1 wherein the CPIM is configured to support connectivity with one or a combination of: single head and dual head displays.

11. The KVM switching system of claim 1 wherein the CPIM is configured to support video communication according to one or a combination of video standards comprising DP, DVI and/or HDMI.

12. The KVM switching system of claim 1 wherein the CPIM is configured to support communication of audio signals.

13. The core KVM switch of claim 1 further comprising serial interface ports for connecting at least one of user console keyboard and pointing device.

14. The core KVM switch of claim 1 further comprising serial interface port for connecting a remote control unit (RCU).

15. The KVM switching system of claim 1, wherein the HIM performs conversion of communication protocols between HDMI and one of: (1) DVI, (2) DisplayPort (DP), and (3) VGA standards.

16. The KVM switching system of claim 1 wherein the HIM is configured to perform one or any combination of: (1) negotiating communication with the core KVM switch based on personal ID of the HIM stored in the HIM, (2) authenticating communication with the core KVM switch; (3) encrypting data sent to the host computer, (4) providing range extension (5) providing information indicative of power requirements of the host computer to the core KVM switch and (6) providing power to at least one or any combination of (a) the HIM circuitries; (b) the host computer; and (c) the core KVM switch from an external power source connected to the core KVM switch via the interface of the HIM.

17. The KVM switching system of claim 1 wherein the HIM is configured to support connectivity with one or a combination of: single head and dual head displays.

18. The KVM switching system of claim 1 wherein the HIM is configured to support video communication according to one or a combination of video standards comprising DP, DVI and/or HDMI.

19. The KVM switching system of claim 1 wherein the HIM is configured to support communication of audio signals.

20. The KVM switching system of claim 1 wherein the CPIM further comprises heat sink elements adapted to allow conveyance of heat from the core KVM switch to a casing of the CPIM.

21. The KVM switching system of claim 1 wherein the HIM further comprises heat sink elements adapted to allow conveyance of heat from the core KVM switch to a casing of the HIM.

* * * * *